(12) United States Patent
Minami

(10) Patent No.: US 11,532,837 B2
(45) Date of Patent: Dec. 20, 2022

(54) SULFIDE SOLID ELECTROLYTE PARTICLES AND ALL-SOLID-STATE BATTERY

(71) Applicant: TOYOTA JIDOSHA KABUSHIKI KAISHA, Toyota (JP)

(72) Inventor: Keiichi Minami, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 237 days.

(21) Appl. No.: 16/743,061

(22) Filed: Jan. 15, 2020

(65) Prior Publication Data

US 2020/0235422 A1  Jul. 23, 2020

(30) Foreign Application Priority Data

Jan. 17, 2019 (JP) .............................. JP2019-006292

(51) Int. Cl.
| | |
|---|---|
| *H01M 10/05* | (2010.01) |
| *H01M 10/0562* | (2010.01) |
| *H01M 4/58* | (2010.01) |
| *H01M 10/0525* | (2010.01) |

(52) U.S. Cl.
CPC ..... *H01M 10/0562* (2013.01); *H01M 4/5815* (2013.01); *H01M 10/0525* (2013.01); *H01M 2300/0068* (2013.01)

(58) Field of Classification Search
None
See application file for complete search history.

(56) References Cited

U.S. PATENT DOCUMENTS

| | | |
|---|---|---|
| 2016/0149259 A1 | 5/2016 | Osada et al. |
| 2016/0156064 A1 | 6/2016 | Miyashita et al. |
| 2017/0331149 A1 | 11/2017 | Sasaki et al. |
| 2018/0062166 A1 | 3/2018 | Sasaki |
| 2018/0138545 A1 | 5/2018 | Aburatani et al. |
| 2018/0175447 A1 | 6/2018 | Kanno et al. |

(Continued)

FOREIGN PATENT DOCUMENTS

| | | |
|---|---|---|
| JP | 2012-094445 A | 5/2012 |
| JP | 2015011901 A | 1/2015 |

(Continued)

OTHER PUBLICATIONS

Communication dated Feb. 10, 2022 from the U.S. Patent & Trademark Office in U.S. Appl. No. 16/743,204.

(Continued)

*Primary Examiner* — Ula C Ruddock
*Assistant Examiner* — Tony S Chuo
(74) *Attorney, Agent, or Firm* — Sughrue Mion, PLLC

(57) ABSTRACT

Provided are sulfide solid electrolyte particles which have sufficient ion conductivity and which are, when used in an all-solid-state battery, configured to suppress a resistance increase rate after charge-discharge cycles, and an all-solid-state battery comprising the sulfide solid electrolyte particles. The sulfide solid electrolyte particles may be sulfide solid electrolyte particles comprising a sulfide solid electrolyte that comprises Li, P, S and a halogen as constituent elements, wherein an oxygen/sulfur element ratio of a particle surface measured by XPS, is 0.79 or more and 1.25 or less, and an oxygen/sulfur element ratio at a depth of 30 nm (in terms of a $SiO_2$ sputter rate) from the particle surface measured by XPS, is 0.58 or less.

4 Claims, 1 Drawing Sheet

(56) References Cited

U.S. PATENT DOCUMENTS

| | | | |
|---|---|---|---|
| 2019/0081352 A1 | 3/2019 | Sasaki et al. |
| 2020/0091552 A1 | 3/2020 | Terai et al. |
| 2020/0130041 A1 | 4/2020 | Iiduka |
| 2020/0235423 A1 | 7/2020 | Minami |
| 2021/0013542 A1 | 1/2021 | Takahashi et al. |

FOREIGN PATENT DOCUMENTS

| | | |
|---|---|---|
| JP | 2017-054720 A | 3/2017 |
| JP | 2018-026321 A | 2/2018 |
| WO | 2015/012042 A1 | 1/2015 |
| WO | 2016/167302 A1 | 10/2016 |
| WO | 2018/216730 A1 | 11/2018 |
| WO | 2019/003333 A1 | 1/2019 |
| WO | 2019176895 A1 | 9/2019 |

OTHER PUBLICATIONS

Notice of Allowance dated May 25, 2022 in U.S. Appl. No. 16/743,204.

SULFIDE SOLID ELECTROLYTE PARTICLES AND ALL-SOLID-STATE BATTERY

TECHNICAL FIELD

The disclosure relates to sulfide solid electrolyte particles and an all-solid-state battery.

BACKGROUND

An all-solid-state battery such as an all-solid-state lithium secondary battery in which a solid electrolyte is used in place of a liquid electrolyte, does not use a combustible organic solvent inside the battery. Accordingly, such an all-solid-state battery is considered to be able to realize a simplified safety device and excellent in production cost and productivity.

The components of such an all-solid-state battery, that is, the cathode, the anode and the electrolytes of the battery, are all solid. Accordingly, the all-solid-state battery has a tendency to have large electrical resistance and provide small output current compared to, for example, a lithium secondary battery comprising an organic liquid electrolyte.

To increase the output current of the all-solid-state lithium secondary battery, therefore, an electrolyte with high ion conductivity may be used. A sulfide solid electrolyte is considered to show higher ion conductivity than an oxide solid electrolyte, since a sulfide ion has large polarizability compared to an oxide ion, and an electrostatic attraction force between a sulfide ion and a lithium ion is small.

However, a battery comprising the sulfide solid electrolyte material has the following problem: when the sulfide solid electrolyte material is brought into contact with an oxide active material, a high-resistance part is formed in an interface between the sulfide solid electrolyte material and the oxide active material, and the sulfide solid electrolyte material becomes prone to deterioration.

Patent Literature 1 discloses a sulfide solid electrolytic material which comprises a sulfide layer containing a sulfide material and an oxide layer containing an oxide formed by oxidation of the sulfide material, wherein the oxide layer is located on a surface of the sulfide layer, and the sulfide solid electrolyte material satisfies $1.28 \leq x \leq 4.06$ and $x/y \geq 2.60$, where "x" is an oxygen/sulfur element ratio of an outermost surface of the oxide layer, which is measured by XPS depth profile analysis, and "y" is an oxygen/sulfur element ratio at a depth of 32 nm (in terms of a $SiO_2$ sputtering rate) from the outermost surface of the oxide layer, which is measured by XPS depth profile analysis. Patent Literature 1 states as follows: by sufficiently increasing the ratio of oxygen binding in the outermost surface of the sulfide solid electrolyte material as in the specific range described above, the electrolysis of the sulfide solid electrolyte material in the outermost surface of the sulfide solid electrolyte material, which may be exposed to high potential by, for example, being in contact with an active material, can be sufficiently suppressed. Patent Literature 1 also states as follows: by reducing oxygen binding in the oxide layer in the vicinity of the boundary surface where the oxide layer is in contact with the sulfide layer as in the specific range described above, high ion conductivity can be maintained and, as a result, the charge/discharge characteristics of the battery can be further improved.

Patent Literature 2 discloses a sulfide solid electrolyte particle comprising an oxide layer on a surface thereof, the oxide layer resulting from the oxidation of the particle itself, and a sulfide solid electrolyte material. Patent Literature 2 states that the oxygen/sulfur element ratio of the surface of the sulfide solid electrolyte particle may be at least twice the oxygen/sulfur element ratio at a depth of 30 nm from the particle surface. Patent Literature 2 also states that the durability of an all-solid-state battery can be improved since the formation of a high resistance part in the interface between the sulfide solid electrolyte particle and an oxide active material, can be suppressed, and since the deterioration of the sulfide solid electrolyte particles can be suppressed.

Patent Literature 1: Japanese Patent Application Laid-Open (JP-A) No. 2018-26321

Patent Literature 2: JP-A No. 2012-94445

In practice, for the sulfide solid electrolyte material with high surface oxygen rate as disclosed in Patent Literature 1, the ion conductivity of the solid electrolyte rapidly decreases. In an all-solid-state battery comprising such a sulfide solid electrolyte material with low ion conductivity, the resistance of the interface between the sulfide solid electrolyte material and the oxide active material largely increases, and the initial resistance of the battery becomes very high. Accordingly, the all-solid-state battery can be only operated at the very low charge/discharge rate as disclosed in Patent Literature 1, and there is a problem with practical use of the all-solid-state battery.

Even for the sulfide solid electrolyte particles as disclosed in Patent Literature 2, it is still insufficient to have sufficient ion conductivity and to suppress a resistance increase rate after charge-discharge cycles. Accordingly, further improvement is expected.

SUMMARY

In light of the above circumstances, an object of the disclosed embodiments is to provide sulfide solid electrolyte particles which have sufficient ion conductivity and which are, when used in an all-solid-state battery, configured to suppress a resistance increase rate after charge-discharge cycles. Another object of the disclosed embodiments is to provide an all-solid-state battery which comprises an electrode or solid electrolyte layer comprising the sulfide solid electrolyte particles.

In a first embodiment, there are provided sulfide solid electrolyte particles comprising a sulfide solid electrolyte that comprises Li, P, S and a halogen as constituent elements, wherein an oxygen/sulfur element ratio of a particle surface measured by XPS, is 0.79 or more and 1.25 or less, and an oxygen/sulfur element ratio at a depth of 30 nm (in terms of a $SiO_2$ sputter rate) from the particle surface measured by XPS, is 0.58 or less.

The sulfide solid electrolyte particles may comprise a sulfide solid electrolyte that comprises Li, P, S, I and Br as constituent elements.

In another embodiment, there is provided an all-solid-state battery comprising a cathode layer, an anode layer and a solid electrolyte layer disposed between the cathode layer and the anode layer, wherein at least one of the cathode layer, the anode layer and the solid electrolyte layer comprises the sulfide solid electrolyte particles described above.

According to the disclosed embodiments, sulfide solid electrolyte particles which have sufficient ion conductivity and which are, when used in an all-solid-state battery, configured to suppress a resistance increase rate after charge-discharge cycles, can be provided. In addition, according to the disclosed embodiments, an all-solid-state battery which comprises an electrode or solid electrolyte layer comprising the sulfide solid electrolyte particles, can be provided.

BRIEF DESCRIPTION OF THE DRAWINGS

In the accompanying drawings.

DETAILED DESCRIPTION

1. Sulfide Solid Electrolyte Particles

The sulfide solid electrolyte particles of the disclosed embodiments are sulfide solid electrolyte particles comprising a sulfide solid electrolyte that comprises Li, P, S and a halogen as constituent elements, wherein an oxygen/sulfur element ratio of a particle surface measured by XPS, is 0.79 or more and 1.25 or less, and an oxygen/sulfur element ratio at a depth of 30 nm (in terms of a $SiO_2$ sputter rate) from the particle surface measured by XPS, is 0.58 or less.

For the sulfide solid electrolyte particles of the disclosed embodiments, the oxygen/sulfur element ratio of the particle surface measured by XPS, is 0.79 or more and 1.25 or less, and the oxygen/sulfur element ratio at a depth of 30 nm (in terms of a $SiO_2$ sputter rate) from the particle surface measured by XPS, is 0.58 or less. Accordingly, compared to the inside of the particles, the oxygen/sulfur element ratio of the particle surface is high. That is, the sulfide solid electrolyte particles have an oxidized surface. The sulfide solid electrolyte particles of the disclosed embodiments may comprise, on the surface thereof, an oxide layer formed by oxidation of the sulfide solid electrolyte particles.

An example of the sulfide solid electrolyte particles of the disclosed embodiments will be described with reference to figures. In the accompanying drawings, for ease of illustration and understanding, the scale and the horizontal to vertical dimensional ratio of the components in the figures are appropriately changed from those of the actual product and exaggerated.

Figure 1:
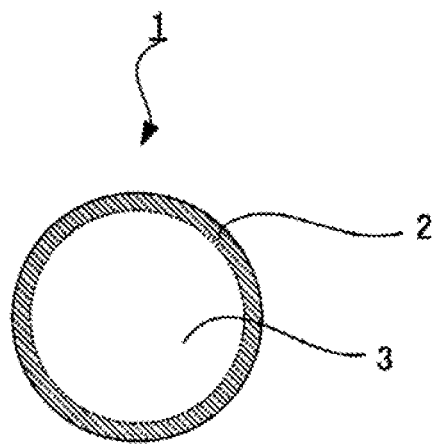
FIG. 1 is a schematic sectional view of an example of the structure of the sulfide solid electrolyte particles according to the disclosed embodiments.

For example, as shown in FIG. 1, a sulfide solid electrolyte particle 1 of the disclosed embodiments is covered with an oxide layer 2, which is formed by oxidation of the surface of a particle composed of a sulfide solid electrolyte (a sulfide solid electrolyte material) 3 that comprises Li, P, S and a halogen as constituent elements.

The surface of the sulfide solid electrolyte particles of the disclosed embodiments is oxidized to ensure that the oxygen/sulfur element ratio of the surface of the sulfide solid electrolyte particles comprising the sulfide solid electrolyte that comprises Li, P, S and a halogen as constituent elements and the oxygen/sulfur element ratio at a depth of 30 nm from the particle surface, satisfy the above-specified values. Accordingly, the sulfide solid electrolyte particles of the disclosed embodiments are sulfide solid electrolyte particles which have sufficient ion conductivity and which are, when used in an all-solid-state battery, configured to suppress a resistance increase rate after charge-discharge cycles.

The sulfide solid electrolyte particles of the disclosed embodiments comprise the sulfide solid electrolyte that comprises Li, P, S and a halogen as constituent elements. Due to containing a halogen, the sulfide solid electrolyte can achieve high ion conductivity compared to a sulfide solid electrolyte which contains Li, P and S and which does not contain a halogen. In general, once the surface of a sulfide solid electrolyte is oxidized, the ion conductivity of the sulfide solid electrolyte is decreased. In the disclosed embodiments, since the surface of the sulfide solid electrolyte material that comprises Li, P, S and a halogen, which has high ion conductivity, is appropriately oxidized to a lesser content than before, a decrease in ion conductivity is suppressed. Accordingly, the sulfide solid electrolyte particles of the disclosed embodiments are considered to obtain sufficient ion conductivity. In addition, since the surface of the sulfide solid electrolyte material that comprises Li, P, S and a halogen, which has high ion conductivity, is appropriately oxidized to a lesser content than before, a reaction in the interface between the sulfide solid electrolyte particles and the oxide active material is suppressed, and various kinds of chemical deterioration are suppressed, during the all-solid-state battery comprising the sulfide solid electrolyte particles is charged and discharged. Accordingly, the resistance increase rate after charge-discharge cycles is suppressed.

[Oxygen/Sulfur Element Ratio]

For the sulfide solid electrolyte particles of the disclosed embodiments, the oxygen/sulfur element ratio of the particle surface measured by XPS, is 0.79 or more and 1.25 or less.

For the sulfide solid electrolyte particles comprising the above-specified sulfide solid electrolyte, if the oxygen/sulfur element ratio of the particle surface measured by XPS is less than 0.79, it is difficult to obtain an action to suppress a reaction in the interface between the sulfide solid electrolyte particles and the oxide active material. Accordingly, there is a possibility that the resistance increase rate after charge-discharge cycles cannot be sufficiently suppressed.

On the other hand, for the sulfide solid electrolyte particles comprising the above-specified sulfide solid electrolyte, if the oxygen/sulfur element ratio of the particle surface measured by XPS is more than 1.25, there is a possibility that the ion conductivity of the sulfide solid electrolyte particles rapidly decreases. From the viewpoint of obtaining excellent ion conductivity, for the sulfide solid electrolyte particles of the disclosed embodiments, the oxygen/sulfur element ratio of the particle surface measured by XPS may be 1.00 or less.

For the sulfide solid electrolyte particles of the disclosed embodiments, the oxygen/sulfur element ratio at a depth of 30 nm (in terms of a $SiO_2$ sputter rate) from the particle surface measured by XPS, is 0.58 or less. Since the oxygen/sulfur element ratio at a depth of 30 nm (in terms of a $SiO_2$ sputter rate) from the particle surface measured by XPS, is 0.58 or less, a decrease in the ion conductivity of the sulfide solid electrolyte particles is suppressed, and excellent ion conductivity is maintained. As long as the oxygen/sulfur element ratio of the particle surface is in the above-specified range, the lower limit of the oxygen/sulfur element ratio at a depth of 30 nm (in terms of a $SiO_2$ sputter rate) from the particle surface measured by XPS, is not particularly limited. The oxygen/sulfur element ratio at a depth of 30 nm (in terms of a $SiO_2$ sputter rate) from the particle surface measured by XPS, may be 0.00, and the lower limit may be about 0.20.

In the disclosed embodiments, the oxygen/sulfur element ratio is a value measured by X-ray photoelectron spectroscopy (XPS). For example, the oxygen/sulfur element ratio can be measured by use of a XPS device ("ULVAC-PHI" manufactured by ULVAC, Inc.)

By use of the XPS device, XPS and sputtering can be combined for depth direction analysis. In particular, the oxygen/sulfur element ratio can be measured as follows: XPS measurement is carried out with sputtering at a predetermined sputter rate; a depth profile is obtained in advance, which is a graph showing the relationship between sputter time and XPS intensity; the depth from the surface is calculated from the sputter rate value obtained by the measurement; and the oxygen/sulfur element ratio at the depth is measured.

When the sulfide solid electrolyte particles of the disclosed embodiments are sulfide solid electrolyte particles comprising, on the surface thereof, the oxide layer formed by the oxidation of the surface of the sulfide solid electrolyte particles, generally, the oxygen/sulfur element ratio continuously decreases as the depth from the surface increases, and the oxygen/sulfur element ratio converges to the original oxygen/sulfur element ratio of the sulfide solid electrolyte of the sulfide solid electrolyte particles. Accordingly, from the viewpoint of preventing defects such as the removal of the oxide layer, the sulfide solid electrolyte particles of the disclosed embodiments may comprise, on the surface thereof, the oxide layer formed by the oxidation of the surface of the sulfide solid electrolyte particles.

[Sulfide Solid Electrolyte]

For the sulfide solid electrolyte particles of the disclosed embodiments, a sulfide solid electrolyte that comprises lithium (Li), phosphorus (P), sulfur (S) and a halogen as constituent elements, is used. For example, the sulfide solid electrolyte particles of the disclosed embodiments may be composed of a $Li_2S$—$P_2S_5$—LiX-based sulfide solid electrolyte obtained from $Li_2S$, $P_2S_5$ and LiX (where X is one or more kinds of elements selected from the group consisting of halogens).

The halogen as X may be one or more kinds of elements selected from the group consisting of fluorine (F), chlorine (Cl), bromine (Br) and iodine (I). From the viewpoint of ion conductivity, the halogen as X may be one or more kinds of elements selected from the group consisting of I, Br and Cl.

For example, the sulfide solid electrolyte that comprises Li, P, S and a halogen as constituent elements, may be a sulfide solid electrolyte of the composition represented by the following general formula: $a(LiX).(1-a)(bLi_2S.(1-b)P_2S_5)$, when the constituent elements Li, P, S and halogen (X) are converted to $Li_2S$, $P_2S_5$ and LiX. In the general formula, "a" corresponds to the total molar ratio of LiX with respect to the total mole of LiX, $Li_2S$ and $P_2S_5$, and "b" corresponds to the molar ratio of $Li_2S$ with respect to the total mole of $Li_2S$ and $P_2S_5$.

For example, "a" may be 0.1 or more and 0.3 or less, or it may be 0.15 or more and 0.25 or less, from the viewpoint of the composition range in which high ion conductivity is obtained.

For example, "b" may be 0.72 or more and 0.78 or less, or it may be 0.74 or more and 0.76 or less, from the viewpoint of the composition range in which highly ion-conducting crystals are precipitated.

Two or more kinds of halogens may be contained in the sulfide solid electrolyte that comprises Li, P, S and a halogen as constituent elements.

From the viewpoint of ion conductivity, it may be a sulfide solid electrolyte that comprises Li, P, S, I and Br as constituent elements, or it may be a $Li_2S$—$P_2S_5$—LiI—LiBr-based sulfide solid electrolyte obtained from $Li_2S$, $P_2S_5$, LiI and LiBr.

When two or more kinds of halogens are contained, the mixing ratio of the halogens is not particularly limited. As described above, when the constituent elements Li, P, S and halogen (X) are converted to $Li_2S$, $P_2S_5$ and LiX, and, for example, when LiI and LiBr are mixed, "c" in the resulting $cLiI.(1-c)LiBr$ may be 0.0 or more and 1.0 or less, or it may be 0.25 or more and 0.67 or less.

The sulfide solid electrolyte used in the sulfide solid electrolyte particles of the disclosed embodiments, may be amorphous or may include a crystal structure in at least a part thereof. The crystal state of the sulfide solid electrolyte of the sulfide solid electrolyte particles can be confirmed by, for example, powder X-ray diffractometry using $CuK\alpha$ radiation.

From the viewpoint of ion conductivity, at least a part of the sulfide solid electrolyte of the sulfide solid electrolyte particles of the disclosed embodiments, may include a crystal structure. For example, in powder X-ray diffractometry using $CuK\alpha$ radiation, the sulfide solid electrolyte of the sulfide solid electrolyte particles may have diffraction peaks at $2\theta=20.2\pm0.5$ (deg) and $2\theta=23.6\pm0.5$ (deg).

The sulfide solid electrolyte of the sulfide solid electrolyte particles of the disclosed embodiments, is a sulfide solid electrolyte that comprises Li, P, S and a halogen as constituent elements. In addition, the sulfide solid electrolyte may comprise other element(s). As the other element(s), examples include, but are not limited to, oxygen, carbon, hydrogen and zirconia.

For the sulfide solid electrolyte of the sulfide solid electrolyte particles of the disclosed embodiments, the elements Li, P, S and halogen may account for 100% by mole of the constituent elements excluding oxygen.

The molar ratio of the elements in the sulfide solid electrolyte can be controlled by controlling the amounts of the elements contained in raw materials. The molar ratio and composition of the elements contained in the sulfide solid electrolyte can be measured by inductively coupled plasma (ICP) atomic emission spectroscopy.

[Sulfide Solid Electrolyte Particles]

As the form of the sulfide solid electrolyte particles of the disclosed embodiments, examples include, but are not limited to, a perfect spherical form and an oval spherical form. The average particle diameter of the sulfide solid electrolyte particles may be in a range of from 0.1 µm to 100 µm, for example. The average particle diameter may be in a range of from 0.5 µm to 20 µm, or it may be in a range of from 0.5 µm to 10 µm.

The average particle diameter of the sulfide solid electrolyte particles may be obtained from, for example, values measured by image analysis using an electron microscope (such as SEM).

For the lithium ion conductivity at 25° C. of the sulfide solid electrolyte particles of the disclosed embodiments, the lower limit may be 2.1 mS/cm or more, or it may be 2.4 mS/cm or more. The upper limit is not particularly limited, and it may be 3.4 mS/cm or less.

[Method for Producing the Sulfide Solid Electrolyte Particles]

The sulfide solid electrolyte particles of the disclosed embodiments may be produced as follows, for example.

From the viewpoint of achieving the objects of the disclosed embodiments, the method for producing the sulfide solid electrolyte particles of the disclosed embodiments, may comprise the step of preparing a sulfide solid electrolyte material and oxidizing the surface of the sulfide solid electrolyte material.

(Preparing a Sulfide Solid Electrolyte Material)

From the viewpoint of achieving the objects of the disclosed embodiments, the sulfide solid electrolyte material used to produce the sulfide solid electrolyte particles of the disclosed embodiments, may be produced from a raw material composition containing $Li_2S$, $P_2S_5$ and LiX (where X is one or more kinds of elements selected from the group consisting of halogens). The raw material composition may be amorphized to form a sulfide solid electrolyte glass, or the sulfide solid electrolyte glass may be crystallized.

As the method for amorphizing the raw material composition, examples include, but are not limited to, mechanical milling and a melt-quenching method. The amorphizing method may be mechanical milling. This is because the raw material composition can be amorphized at normal temperature, and the production process can be simplified.

The melt-quenching method has a limit to a reaction atmosphere or reaction container used. Meanwhile, the mechanical milling is advantageous in that a sulfide solid electrolyte glass of a desired composition can be simply and easily synthesized.

The mechanical milling may be dry or wet mechanical milling. The mechanical milling may be the latter. This is because the raw material composition can be prevented from attaching to the inner wall surface of a container, etc., and a sulfide solid electrolyte glass with higher amorphous nature can be obtained.

The mechanical milling is not particularly limited, as long as it is a method for mixing the raw material composition by applying mechanical energy thereto. The mechanical milling may be carried out by, for example, a ball mill, a vibrating mill, a turbo mill, mechanofusion, or a disk mill. The mechanical milling may be carried out by a ball mill, or it may be carried out by a planetary ball mill. This is because the desired sulfide solid electrolyte glass can be efficiently obtained.

The conditions of the mechanical milling are determined to ensure that the desired sulfide solid electrolyte glass can be obtained. For example, in the case of using the planetary ball mill, the raw material composition and grinding balls are put in a container, and mechanical milling is carried out at a predetermined rotational frequency for a predetermined time. In general, the larger the rotational frequency, the faster the production speed of the sulfide solid electrolyte glass. Also, the longer the treatment time, the higher the conversion rate of the raw material composition into the sulfide solid electrolyte glass.

In the case of using the planetary ball mill, the plate rotational frequency is in a range of from 200 rpm to 500 rpm, for example. The plate rotational frequency may be in a range of from 250 rpm to 400 rpm.

In the case of using the planetary ball mill, the mechanical milling time is in a range of from 1 hour to 100 hours, for example. The mechanical milling time may be in a range of from 1 hour to 50 hours.

As the material for the container and grinding balls used in the ball mill, examples include, but are not limited to, $ZrO_2$ and $Al_2O_3$.

The diameter of the grinding balls is in a range of from 1 mm to 20 mm, for example.

A liquid is used for wet mechanical milling. The liquid may be a liquid that does not produce hydrogen sulfide in a reaction with the raw material composition. Hydrogen sulfide can be produced when protons are dissociated from the molecules of the liquid and reacted with the raw material composition or the sulfide solid electrolyte glass. Accordingly, the liquid may have aprotic properties to a degree that does not result in the production of hydrogen sulfide. Aprotic liquids can be broadly classified into polar and non-polar aprotic liquids.

The polar aprotic liquid is not particularly limited. As the polar aprotic liquid, examples include, but are not limited to, ketones such as acetone; nitriles such as acetonitrile; amides such as N,N-dimethylformamide (DMF); and sulfoxides such as dimethylsulfoxide (DMSO).

As the non-polar aprotic liquid, examples include, but are not limited to, aliphatic hydrocarbons such as heptane; aromatic hydrocarbons such as benzene, toluene and xylene; chain ethers such as diethyl ether and dimethyl ether; cyclic ethers such as tetrahydrofuran; alkyl halides such as chloroform, methyl chloride and methylene chloride; esters such as ethyl acetate; and fluorine compounds such as benzene fluoride, heptane fluoride, 2,3-dihydroperfluoropentane, and 1,1,2,2,3,3,4-heptafluorocyclopentane. The amount of the added liquid is not particularly limited, and it may be an amount to a degree that can obtain the desired sulfide solid electrolyte.

The thus-obtained sulfide solid electrolyte glass may be further pulverized into small-diameter glass particles.

In this case, as with the above-described mechanical milling, the sulfide solid electrolyte glass and grinding balls were put in a container, and the container is subjected to pulverization at a predetermined rotational frequency for a predetermined time.

Also in this case, the diameter of the grinding balls may be in a range of from 0.3 mm to 1.0 mm, for example.

To ensure that the sulfide solid electrolyte glass is pulverized by wet mechanical milling, the pulverization may be carried out in the presence of the liquid used for the above-described wet mechanical milling. If the liquid contains an oxygen atom-containing compound, the liquid can serve as an oxidant in the below-described step of oxidizing the surface of the sulfide solid electrolyte material. As the oxygen atom-containing compound, examples include, but are not limited to, chain ethers such as diethyl ether and dimethyl ether.

The thus-obtained sulfide solid electrolyte glass or the thus-obtained small-diameter glass particles may be crystallized.

As the step of crystallizing the sulfide solid electrolyte glass or the small-diameter glass particles, examples include, but are not limited to, the step of crystallizing the sulfide solid electrolyte glass or the small-diameter glass particles by heating at a temperature that is equal to or higher than the crystallization temperature of the glass.

The crystallizing step may be carried out simultaneously with the step of oxidizing the surface of the sulfide solid electrolyte material.

(Oxidizing the Surface of the Sulfide Solid Electrolyte Material)

The step of oxidizing the surface of the sulfide solid electrolyte material (i.e., the surface oxidizing step), is a step of forming the oxide layer by bringing the sulfide solid electrolyte material into contact with an oxidant and thus oxidizing the surface.

The oxidant used in this step is not particularly limited, as long as it can oxidize the surface of the sulfide solid electrolyte material and form the oxide layer on the surface. For example, a gas can be used as the oxidant. As the gas, examples include, but are not limited to, an oxygen-containing gas such as the air and pure oxygen, and the oxygen atom-containing compound (such as chain ethers) used for the above-mentioned wet mechanical milling.

The moisture content of the gas may be as small as possible. This is because, if the gas contains moisture, the below-described drying step will be needed.

The method for oxidizing the surface used in this step, is not particularly limited and may be a commonly used method, as long as the surface of the sulfide solid electrolyte material can be oxidized, and the oxide layer is formed. As the method, examples include, but are not limited to, a method for oxidizing the surface by leaving the sulfide solid electrolyte material in a gas having a predetermined temperature and a predetermined humidity, for a predetermined time.

The surface oxidizing conditions such as the temperature, humidity and time are not particularly limited, as long as they are conditions in which the surface is oxidized and the oxide layer is formed. For example, in the case of using the air as the oxidant, the surface oxidizing step and the below-described drying step are carried out as a preliminary experiment in the air, and then the surface oxidizing conditions in which the oxide layer with the desired oxygen/sulfur element ratio is formed, such as temperature, humidity and time, can be determined.

From the viewpoint of achieving the objects of the disclosed embodiments and increasing the ion conductivity, the method for preparing the sulfide solid electrolyte particles of the disclosed embodiments may comprise the step of oxidizing and crystallizing the sulfide solid electrolyte glass or the small-diameter glass particles by heating at a temperature equal to or higher than the crystallization temperature of the glass, in the presence of the oxidant.

The crystallization temperature (Tc) of the sulfide solid electrolyte glass or the small-diameter glass particles can be measured by thermal analysis measurement (DTA).

The heating temperature may be a temperature higher than the crystallization temperature (Tc) of the sulfide solid electrolyte glass or the small-diameter glass particles, which is a temperature observed by thermal analysis measurement. In general, it is 195° C. or more, or it may be 200° C. or more. On the other hand, the upper limit of the heating temperature is not particularly limited. The upper limit may be a temperature obtained by adding up to 20° C. to the crystallization temperature (Tc).

The heating time is not particularly limited, as long as the desired crystallinity is obtained. For example, it is in a range of from one minute to 24 hours, or it may be in a range of from one minute to 10 hours.

The heating may be carried out in an inert gas atmosphere (such as argon gas and nitrogen gas) except that a slight amount of oxygen gas is contained as the oxidant. As the gas in which a slight amount of oxygen gas is contained as the oxidant, examples include, but are not limited to, an inert gas in which 0.1 volume % or more and 2.0 volume % or less of oxygen gas is contained.

The heating method is not particularly limited. For example, a firing furnace may be used.

In the sulfide solid electrolyte material obtained through the heating step, the glass may be absolutely crystallized by the heating, or the glass may fail to be absolutely crystallized and may remain therein.

(Other Step)

The method for producing the sulfide solid electrolyte particles of the disclosed embodiments may further comprise a drying step, for example.

The drying step is carried out after the surface oxidizing step. The drying step is a step in which moisture is removed from the oxide layer formed on, by the surface oxidizing step, the surface of the sulfide solid electrolyte material, thereby forming the sulfide solid electrolyte particles comprising, on the surface thereof, the moisture-free oxide layer.

The drying method used in this step is not particularly limited and may be a commonly-used method, as long as it is a method by which the moisture-free oxide layer is obtained. As the drying method, examples include, but are not limited to, a method for drying the surface of the sulfide solid electrolyte material in a predetermined atmosphere, at a predetermined temperature, for a predetermined time.

For example, the above-described surface oxidizing step and drying step are carried out as a preliminary experiment, and then the drying conditions in which the oxide layer with the desired oxygen/sulfur element ratio is formed, such as temperature, humidity and time, may be determined.

The drying atmosphere is not particularly limited, as long as it is an atmosphere in which moisture can be removed from the moisture-containing oxide layer by drying, thereby forming a moisture-free oxide layer. As the drying atmosphere, examples include, but are not limited to, a vacuum atmosphere.

[Applications of the Sulfide Solid Electrolyte Particles]

The sulfide solid electrolyte particles of the disclosed embodiments may be used in an all-solid-state battery, for example. As the type of the all-solid-state battery, examples include, but are not limited to, an all-solid-state lithium battery, an all-solid-state lithium ion battery, an all-solid-state magnesium battery, an all-solid-state sodium battery and an all-solid-state calcium battery. The all-solid-state battery may be an all-solid-state lithium battery, an all-solid-state lithium ion battery, or an all-solid-state sodium battery, or the all-solid-state battery may be an all-solid-state lithium battery or an all-solid-state lithium ion battery.

2. All-Solid-State Battery

The all-solid-state battery of the disclosed embodiments is an all-solid-state battery comprising a cathode layer, an anode layer and a solid electrolyte layer disposed between the cathode layer and the anode layer, wherein at least one of the cathode layer, the anode layer and the solid electrolyte layer comprises the sulfide solid electrolyte particles of the disclosed embodiments.

Figure 2:
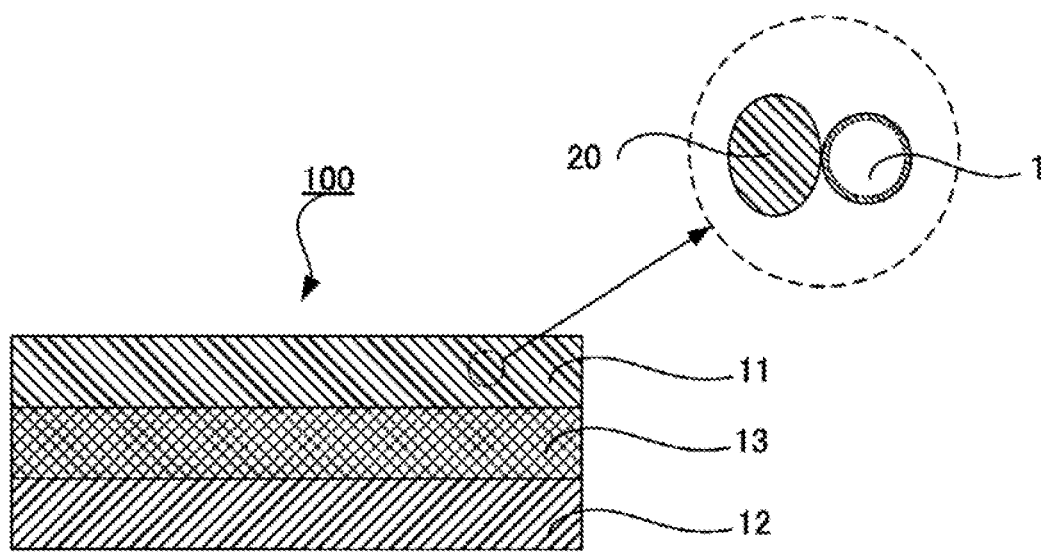
FIG. 2 is a schematic sectional view of an example of the power generation element of the all-solid-state battery according to the disclosed embodiments.

FIG. 2 is a schematic sectional view of an example of the power generation element of the all-solid-state battery according to the disclosed embodiments. A power generation element 100 shown in FIG. 2 comprises a cathode layer 11, an anode layer 12, and a solid electrolyte layer 13 disposed between the cathode layer 11 and the anode layer 12. In the cathode layer 11, a cathode active material 20 and sulfide solid electrolyte particles 1 are contained and uniformly mixed.

In FIG. 2, during the all-solid-state battery is charged, for example, lithium ions are extracted from the cathode active material 20 in the cathode layer 11 and transfers to the anode layer 12 through the sulfide solid electrolyte particles 1 and the solid electrolyte layer 13. On the other hand, during the all-solid-state battery is discharged, lithium ions are extracted from the anode layer 12 and transfers to the cathode active material 20 through the solid electrolyte layer 13. In general, during the all-solid-state battery is charged/discharged, lithium ions transfer through the interface between the cathode active material and the sulfide solid electrolyte material. Accordingly, to allow the all-solid battery to be a high-capacity and high-power all-solid-state battery, it is important to suppress an increase in the resistance of the interface.

In FIG. 2, since the surface of the sulfide solid electrolyte particles 1 is oxidized, a reaction in the interface between the cathode active material 20 and the sulfide solid electrolyte particles is suppressed, and various kinds of chemical deterioration are suppressed. Accordingly, the all-solid-state battery of the disclosed embodiments suppresses the resistance increase rate after charge-discharge cycles.

In the above description, the case where the cathode layer comprises the sulfide solid electrolyte particles of the disclosed embodiments, is exemplified. However, the disclosed embodiments are not limited to this case.

For example, in the case where the solid electrolyte layer 13 comprises the sulfide solid electrolyte particles 1, since the surface of the sulfide solid electrolyte particles 1 is oxidized, a reaction in the interface between the active material contained in the cathode layer 11 or the anode layer and the sulfide solid electrolyte particles 1, is suppressed, and various kinds of chemical deterioration are suppressed. Accordingly, the all-solid-state battery of the disclosed embodiments suppresses the resistance increase rate after charge-discharge cycles.

For example, in the case where the anode layer 12 comprises an anode active material and the sulfide solid electrolyte particles of the disclosed embodiments, since the surface of the sulfide solid electrolyte particles 1 is oxidized, a reaction in the interface between the anode active material and the sulfide solid electrolyte particles is suppressed, and various kinds of chemical deterioration are suppressed. Accordingly, the all-solid-state battery of the disclosed embodiments suppresses the resistance increase rate after charge-discharge cycles.

For the all-solid-state battery of the disclosed embodiments, from the viewpoint of suppressing the resistance increase rate after charge-discharge cycles, at least one of the cathode layer and the solid electrolyte layer may comprise the sulfide solid electrolyte particles, or the cathode layer may comprise the sulfide solid electrolyte particles.

For the all-solid-state battery of the disclosed embodiments, from the viewpoint of suppressing the resistance increase rate after charge-discharge cycles, all of the cathode layer, the anode layer and the solid electrolyte layer may comprise the sulfide solid electrolyte particles of the disclosed embodiments.

Hereinafter, the components of the all-solid-state battery of the disclosed embodiments will be described in order.

[Cathode Layer]

The cathode layer comprises at least a cathode active material and a solid electrolyte. As needed, it comprises an electroconductive material and a binder.

In the case where the sulfide solid electrolyte particles of the disclosed embodiments are contained as the solid electrolyte of the cathode layer, an oxide cathode active material may be used as the cathode active material, from the viewpoint of suppressing the resistance increase rate after charge-discharge cycles.

As the oxide cathode active material, examples include, but are not limited to, a cathode active material represented by the following general formula: $Li_xM_yO_z$ (where M is a transition metal element; x is from 0.02 to 2.2; y is from 1 to 2; and z is from 1.4 to 4). The transition metal element M may be at least one selected from the group consisting of Co, Mn, Ni, V, Fe and Si, or it may be at least one selected from the group consisting of Co, Ni and Mn. As the oxide cathode active material, examples include, but are not limited to, $LiCoO_2$, $LiMnO_2$, $LiNiO_2$, $LiVO_2$, $LiNi_{1/3}Co_{1/3}Mn_{1/3}O_2$, $LiMn_2O_4$, $Li(Ni_{0.5}Mn_{1.5})O_4$, $Li_2FeSiO_4$ and $Li_2MnSiO_4$. Cathode active materials other than the one represented by the general formula $Li_xM_yO_z$ include, for example, olivine-type cathode active materials such as $LiFePO_4$ and $LiMnPO_4$.

As the cathode active material of the cathode layer, a conventionally-known cathode active material other than the oxide cathode active materials may be used.

The form of the cathode active material is not limited. As the form of the cathode active material, examples include, but are not limited to, a particulate form and a plate form.

The content of the cathode active material in the cathode layer is not particularly limited. For example, it may be in a range of from 10 mass % to 99 mass %, may be in a range of from 20 mass % to 90 mass %, or may be in a range of from 40 mass % to 85 mass %.

In the case where the sulfide solid electrolyte particles of the disclosed embodiments are contained as the solid electrolyte of the cathode layer, the content of the sulfide solid electrolyte particles of the disclosed embodiments in the cathode layer, is not particularly limited. For example, it may be in a range of from 1 mass % to 80 mass %, may be in a range of from 5 mass % to 70 mass %, or may be in a range of from 10 mass % to 50 mass %.

In the case where the cathode layer does not comprise the sulfide solid electrolyte particles of the disclosed embodiments, a solid electrolyte may be appropriately selected from solid electrolytes exemplified below in connection with the below-described solid electrolyte layer, and it may be used as the solid electrolyte. In the case where the cathode layer does not comprise the sulfide solid electrolyte particles of the disclosed embodiments, the content of the solid electrolyte may be the same as the content of the sulfide solid electrolyte particles.

As the electroconductive material, examples include, but are not limited to, carbonaceous materials such as acetylene black and Ketjen black, fibrous carbon such as carbon fiber, and metal materials.

The content of the electroconductive material in the cathode layer is not particularly limited. For example, it may be in a range of from 0 mass % to 10 mass %, or it may be in a range of from 1 mass % to 5 mass %.

The binder is not particularly limited. As the binder, examples include, but are not limited to, butadiene rubber (BR), polyvinylidene fluoride (PVDF) and styrene-butadiene rubber (SBR).

The content of the binder in the cathode layer is not particularly limited. For example, it may be in a range of from 0 mass % to 20 mass %, or it may be in a range of from 0.1 mass % to 10 mass %.

The thickness of the cathode layer is not particularly limited. For example, it may be from 10 μm to 250 μm, or it may be from 20 μm to 200 μm.

[Anode Layer]

The anode layer comprises at least an anode active material and a solid electrolyte. As needed, it comprises an electroconductive material and a binder.

In the case where the sulfide solid electrolyte particles of the disclosed embodiments are contained as the solid electrolyte of the anode layer, from the viewpoint of suppressing the resistance increase rate after charge-discharge cycles, an oxide anode active material may be used as the anode active material.

As the oxide anode active material, examples include, but are not limited to, an active material having a spinel structure. As the active material, examples include, but are not limited to, $Li_4Ti_5O_{12}$, $Li_4Mn_2O_4$ and $Li_4Mn_5O_{12}$.

As the anode active material of the anode layer, a conventionally-known anode active material other than the oxide anode active material, may be used. As the conventionally-known anode active material, examples include, but are not limited to, Li metal, graphite, Si metal and Si alloy.

The form of the anode active material is not particularly limited. As the form, examples include, but are not limited to, a particulate form and a plate form.

In the anode layer, the content of the anode active material, that of the sulfide solid electrolyte particles of the disclosed embodiments and that of the solid electrolyte may be the same as those of the cathode layer.

The electroconductive material and binder contained in the anode layer and the contents thereof, may be the same as the electroconductive material and binder contained in the cathode layer and the contents thereof.

[Solid Electrolyte Layer]

The solid electrolyte layer comprises at least a solid electrolyte. As needed, it may comprise a binder, etc.

As the solid electrolyte used in the solid electrolyte layer, examples include, but are not limited to, an oxide-based solid electrolyte material and a sulfide-based solid electrolyte material. From the viewpoint of high lithium ion conductivity, the solid electrolyte used in the solid electrolyte layer may be a sulfide solid electrolyte material.

The solid electrolyte of the solid electrolyte layer may comprise the sulfide solid electrolyte particles of the disclosed embodiments, from the viewpoint of suppressing the resistance increase rate after charge-discharge cycles. In this case, from the viewpoint of suppressing the resistance increase rate after charge-discharge cycles, at least one of the cathode layer and the anode layer may comprise an oxide active material.

In the solid electrolyte layer, a sulfide-based solid electrolyte material different from the sulfide solid electrolyte particles of the disclosed embodiments, may be used. As the different sulfide-based solid electrolyte material, examples include, but are not limited to, $Li_2S$—$SiS_2$, $LiI$—$Li_2S$—$SiS_2$, $LiI$—$Li_2S$—$P_2S_5$, $LiI$—$Li_2S$—$P_2O_5$, $LiI$—$Li_3PO_4$—$P_2S_5$, $LiI$—$Li_2O$—$Li_2S$—$P_2S_5$, $LiBr$—$LiI$—$Li_2S$—$P_2S_5$, and $Li_2S$—$P_2S_5$.

More specifically, examples include, but are not limited to, $Li_7P_3S_{11}$, $Li_3PS_4$, $Li_8P_2S_9$, $Li_{13}GeP_3S_{16}$, $Li_{10}GeP_2S_{12}$, $15LiBr.10LiI.75(0.75Li_2S.0.25P_2S_5)$ and $70(0.06Li_2O.0.69Li_2S.0.25P_2S_5).30LiI$. These compositions are on a molar basis.

As the sulfide-based solid electrolyte material different from the sulfide solid electrolyte particles of the disclosed embodiments, sulfide solid electrolyte particles in such a state that they are not yet subjected to the particle surface oxidizing step and the oxygen concentration of the particle surface is less than the range of the sulfide solid electrolyte particles of the disclosed embodiments, may be used.

As the solid electrolyte, one or more kinds of solid electrolytes may be used.

The content of the solid electrolyte in the solid electrolyte layer is not particularly limited. For example, it may be 50 mass % or more, may be 100 mass %, may be in a range of from 70 mass % to 99.99 mass %, or may be in a range of from 90 mass % to 99.9 mass %.

The binder that may be contained in the solid electrolyte layer as needed, may be the same as the binder contained in the cathode layer.

The content of the binder in the solid electrolyte layer is not particularly limited. For example, it may be in a range of from 0 mass % to 20 mass %, or it may be in a range of from 0.1 mass % to 10 mass %.

The thickness of the solid electrolyte layer is not particularly limited. It may be the same as the thickness of the solid electrolyte film generally used in an all-solid-state lithium secondary battery.

[Cathode Current Collector and Anode Current Collector]

In the all-solid-state battery of the disclosed embodiments, a cathode current collector and an anode current collector, which are not shown in FIG. 2, are generally used. The cathode current collector collects current from the cathode layer. The cathode current collector is not particularly limited, as long as it functions as a cathode current collector. The material for the cathode current collector is not particularly limited, as long as it is an electroconductive material. As the material, examples include, but are not limited to, stainless-steel (SUS), aluminum, nickel, iron, titanium, copper and carbon. The cathode current collector may be a dense metal current collector or a porous metal current collector.

The anode current collector collects current from the anode layer. The anode current collector is not particularly limited, as long as it functions as an anode current collector. As the material for the anode current collector, examples include, but are not limited to, those exemplified above as the material for the cathode current collector.

The cathode and anode current collectors used in the disclosed embodiments may also function as a battery casing. For example, a battery casing made of SUS is prepared, and a part of the battery casing may be used to collect current.

[Other Component]

As needed, the all-solid-state battery comprises an outer casing for housing the cathode, the anode and the solid electrolyte layer.

The form of the outer casing is not particularly limited. As the form, examples include, but are not limited to, a laminate form.

The material for the outer casing is not particularly limited, as long as it is stable in electrolyte. As the material, examples include, but are not limited to, resins such as polypropylene, polyethylene and acrylic resin.

As the all-solid-state battery, examples include, but are not limited to, an all-solid-state lithium battery, an all-solid-state lithium ion battery, an all-solid-state magnesium battery, an all-solid-state sodium battery and an all-solid-state calcium battery. The all-solid-state battery may be an all-solid-state lithium battery, an all-solid-state lithium ion battery, or an all-solid-state sodium battery, or it may be an all-solid-state lithium battery or an all-solid-state lithium ion battery.

As the form of the all-solid-state battery, examples include, but are not limited to, a coin form, a laminate form, a cylindrical form and a square form.

The method for producing the all-solid-state battery of the disclosed embodiments is not particularly limited, as long as it is a method by which the above-described all-solid-state battery is obtained. As the method, a common all-solid-state battery production method may be used. As the method for producing the all-solid-state battery, examples include, but are not limited to, the following method: the material for the cathode layer, the material for the solid electrolyte layer, and the material for the anode layer are pressed in order, thereby producing a power generation element; this power generation element is stored in the battery casing; and the battery casing is swaged, thereby producing the all-solid-state battery.

EXAMPLES

Example 1

(1) Production of Sulfide Solid Electrolyte Particles

First, 0.5503 g of $Li_2S$ (manufactured by Furuuchi Chemical Corporation), 0.8874 g of $P_2S_5$ (manufactured by Aldrich), 0.2850 g of LiI (manufactured by Kojundo Chemical Laboratory Co., Ltd.) and 0.2773 g of LiBr (manufactured by Kojundo Chemical Laboratory Co., Ltd.) were put in a zirconia pot (45 ml) containing zirconia balls (diameter 5 mm). Then, 4 g of dehydrated heptane (manufactured by Kanto Chemical Co., Inc.) was put in the zirconia pot. The pot was closed. The zirconia pot was installed in a planetary ball mill ("P-7" manufactured by Fritsch) and subjected to mechanical milling for 20 hours, thereby obtaining a sulfide solid electrolyte glass.

Next, 2 g of the sulfide solid electrolyte glass was put in a zirconia pot containing zirconia balls (diameter 0.3 mm). Then, 2 g of dibutyl ether (manufactured by Kishida Chemical Co., Ltd.) and 6 g of dehydrated heptane were put in the zirconia pot. The materials in the zirconia pot was mixed for 20 hours, thereby producing small-diameter glass particles.

The small-diameter glass particles were sintered by, while flowing them with 100 volume % Ar, heating the small-diameter glass particles at a temperature (200° C.) that is equal to or higher than the crystallization temperature thereof for 3 hours. As a result, the sulfide solid electrolyte particles 1 of Example 1 were obtained. In Example 1, the dibutyl ether used for the production of the small-diameter glass particles served as an oxidant during the sintering.

The oxygen/sulfur element ratio of the surface of the sulfide solid electrolyte particles 1 and the oxygen/sulfur element ratio at a depth of 30 nm from the particle surface, were obtained by XPS measurement described below. The results are shown in Table 1.

Also, powder X-ray diffraction measurement of the sulfide solid electrolyte particles 1 was carried out as described below. As a result, the sulfide solid electrolyte particles 1 were found to have diffraction peaks at 2θ=20.1 (deg) and 2θ=23.7 (deg).

(2) Production of All-Solid-State Lithium Ion Secondary Battery (2-1) Production of Cathode As a cathode active material, $LiNi_{1/3}Co_{1/3}Mn_{1/3}O_2$ (manufactured by Nichia Corporation) was used. The cathode active material was surface-treated with $LiNbO_3$. Next, 1.862 g of the surface-treated cathode active material, 0.028 g of VGCF (carbonaceous electroconductive material manufactured by Showa Denko K. K.), 0.295 g of the sulfide solid electrolyte particles 1 as a solid electrolyte, 0.279 g of PVDF (manufactured by Kureha Corporation) and 0.999 g of butyl butyrate (manufactured by Nacalai Tesque, Inc.) were prepared. They were mixed by use of an ultrasonic homogenizer ("UH-50" manufactured by SMT) to obtain a mixture. The mixture was used as a cathode mixture. The cathode mixture was applied on an Al foil (a cathode current collector). The applied cathode mixture was dried on a hot plate at 100° C. for 30 minutes, thereby producing a cathode sheet. The cathode sheet was cut in a size of 1 cm² by a cutting device. The thus-obtained cathode sheet with a size of 1 cm² was used as a cathode layer.

(2-2) Production of Anode

First, 0.800 g of a silicon metal (manufactured by Elkem) as an anode active material, 0.621 g of the sulfide solid electrolyte particles 1 as a solid electrolyte, 0.320 g of PVDF (manufactured by Kureha Corporation) and 1.643 g of butyl butyrate (manufactured by Nacalai Tesque, Inc.) were prepared. They were mixed by use of the ultrasonic homogenizer ("UH-50" manufactured by SMT) to obtain a mixture. The mixture was used as an anode mixture. The anode mixture was applied on a Cu foil (an anode current collector). The applied anode mixture was dried on the hot plate at 100° C. for 30 minutes, thereby producing an anode sheet. The anode sheet was cut in a size of 1 cm² by the cutting device. The thus-obtained anode sheet with a size of 1 cm² was used as an anode layer.

(2-3) Production of Solid Electrolyte Layer

First, 0.400 g of the sulfide solid electrolyte particles 1 as a solid electrolyte, 0.032 g of an amino-modified, hydrogenated butadiene rubber (manufactured by JSR), 0.715 g of dehydrated heptane and 0.050 g of butyl butyrate were prepared. They were mixed by use of the ultrasonic homogenizer to obtain a mixture. The mixture was applied on an Al foil, and the applied mixture was dried on the hot plate at 100° C. for 30 minutes, thereby producing a solid electrolyte sheet. The solid electrolyte sheet was cut in a size of 1 cm² by the cutting device. From the solid electrolyte sheet with a size of 1 cm², the Al foil was removed. Then, the thus-obtained solid electrolyte sheet including no Al foil, was used as a solid electrolyte layer. This process was repeated three times to produce a total of three solid electrolyte layers.

(2-4) Production of All-Solid-State Lithium Ion Secondary Battery

In a 1 cm² mold made of Macor ceramics, the cathode layer, the three solid electrolyte layers and the anode layer were stacked in this order and attached. The resulting stack was sandwiched by SUS pins. In this state, the stack was pressed at a pressure of 6 t/cm² (≈588 MPa), thereby producing the all-solid-state lithium ion secondary battery of Example 1.

Example 2

The sulfide solid electrolyte particles 2 of Example 2 were produced in the same manner as Example 1, except that in "(1) Production of sulfide solid electrolyte particles", the sintering atmosphere of the small-diameter glass particles was changed to 99.5 volume % Ar and 0.5 volume % $O_2$ gas.

The all-solid-state lithium ion secondary battery of Example 2 was produced in the same manner as Example 1, except that in "(2-4) Production of all-solid-state lithium ion secondary battery", the sulfide solid electrolyte particles 2 of Example 2 were used in place of the sulfide solid electrolyte particles 1 of Example 1.

Example 3

The sulfide solid electrolyte particles 3 of Example 3 were produced in the same manner as Example 1, except that in "(1) Production of sulfide solid electrolyte particles", the sintering atmosphere of the small-diameter glass particles was changed to 99 volume % Ar and 1 volume % $O_2$ gas.

The all-solid-state lithium ion secondary battery of Example 3 was produced in the same manner as Example 1, except that in "(2-4) Production of all-solid-state lithium ion secondary battery", the sulfide solid electrolyte particles 3 of Example 3 were used in place of the sulfide solid electrolyte particles 1 of Example 1.

Comparative Example 1

The comparative sulfide solid electrolyte particles 1 of Comparative Example 1 were produced in the same manner as Example 1, except that in "(1) Production of sulfide solid electrolyte particles", the sintering atmosphere of the small-diameter glass particles was changed to 98 volume % Ar and 2 volume % $O_2$ gas.

The all-solid-state lithium ion secondary battery of Comparative Example 1 was produced in the same manner as Example 1, except that in "(2-4) Production of all-solid-state lithium ion secondary battery", the comparative sulfide solid electrolyte particles 1 of Comparative Example 1 were used in place of the sulfide solid electrolyte particles 1 of Example 1.

[Evaluation]

(1) Measurement of Oxygen/Sulfur Element Ratio

For the sulfide solid electrolyte particles obtained in each of Examples 1 to 3 and Comparative Example 1, the oxygen/sulfur element ratio of the particle surface and the oxygen/sulfur element ratio at a depth of 30 nm (in terms of a $SiO_2$ sputter rate) from the particle surface, were measured by XPS.

The XPS measurement conditions are as follows.

XPS measurement device: "ULVAC-PHI" (manufactured by ULVAC, Inc.)

<XPS Measurement Conditions>

Measurement light source: Al (monochromator)
Analysis area: 200 μm φ
Pass energy: 187 eV (wide scan) and 46 eV (narrow scan)
Energy step: 0.8 eV (wide scan) and 0.1 eV (narrow scan)

<Sputtering Conditions>

Accelerating voltage and current: 3.0 kV and 20 mA
AMPL: (3 mm×3 mm)
Sputter rate: 3.9 nm/min (in terms of $SiO_2$)

Etching was carried out to obtain the distribution of each element in the depth direction. Based on the thus-obtained distribution data, the O/S element ratio of the outermost surface and the O/S element ratio at a depth of 30 nm were obtained. The depth of 30 nm was calculated from the sputter rate of 3.9 nm/min (in terms of $SiO_2$).

(2) X-Ray Crystal Diffraction Measurement

For the sulfide solid electrolyte particles obtained in each of Examples 1 to 3 and Comparative Example 1, the XRD spectrum was obtained by powder X-ray diffractometry using CuKα radiation. In this measurement, a powder X-ray diffractometer ("RINT-ULTIMA III" manufacture by Rigaku Corporation) was used. The measurement was carried out at a scan rate of 1°/min and a diffraction angle in a range of from 10° to 40° (2θ=10° to 40°).

(3) Ion Conductivity

First, 100 mg of the sulfide solid electrolyte particles of each of Examples 1 to 3 and Comparative Example 1, were prepared and subjected to preliminary pressing at a pressure of 7 MPa by use of a pellet forming machine, thereby producing a solid electrolyte pellet. Next, a carbon coat foil having a thickness of 21 μm was disposed on both surfaces of the solid electrolyte pellet. The solid electrolyte pellet sandwiched by the carbon coat foils, was further sandwiched by stainless-steel (SUS) pins. In this state, the resulting stack was subjected to cold pressing at a pressure of 40 MPa, which was main pressing, and then bolted at a torque of 6 N, thereby obtaining an ion conductivity measurement cell.

The ion conductivity measurement cell was installed in an AC impedance measurement device ("SOLATRON 1260" manufactured by Solartron Analytical). AC impedance measurement (25° C.) of the cell was carried out in the following conditions to obtain the resistance of the cell.

Applied voltage: 10 mV
Measured frequency range: 0.01 MHz to 1 MHz

The ion conductivity of Example 1 was calculated from the resistance obtained by the AC impedance measurement and the thickness of the pellet.

(4) Resistance Increase Rate After Charge-Discharge Cycles

At 25° C., the all-solid-state battery of each of Examples 1 to 3 and Comparative Example 1, was charged and discharged for one cycle with constant current and constant voltage at 4.55 V to 3 V at 1/3 C. Then, the all-solid-state battery was charge and discharged for 5 cycles at 4.37 V to 3 V at 1/3 C. Then, the resistance of the all-solid-state battery was obtained and determined as the initial battery resistance. Then, at 60° C., the all-solid-state battery was charged and discharged for 300 cycles at 4.37 V to 3 V at 2 C. Then, the resistance of the battery was obtained and determined as the battery resistance after the charge-discharge cycles. The percentage of the battery resistance after the charge-discharge cycles in the case where the initial battery resistance was determined as 100%, was calculated and determined as the resistance increase rate of the all-solid-state battery.

Resistance increase rate (%) after charge-discharge cycles=(Battery resistance after charge-discharge cycles)/(Initial battery resistance)×100

[Results]

The following Table 1 shows a comparison between Examples 1 to 3 and Comparative Example 1 in the ion conductivity and the resistance increase rate after the charge-discharge cycles, along with the oxygen/sulfur element ratio of the surface of the sulfide solid electrolyte particles and the oxygen/sulfur element ratio at a depth of 30 nm (in terms of a $SiO_2$ sputter rate) from the particle surface.

TABLE 1

|  | O/S ratio of outermost particle surface | O/S ratio at a depth of 30 nm from the particle surface | Ion conductivity (mS/cm) | Resistance increase rate (%) after charge-discharge cycles |
| --- | --- | --- | --- | --- |
| Example 1 | 0.79 | 0.29 | 3.4 | 142 |
| Example 2 | 0.98 | 0.39 | 2.4 | 114 |
| Example 3 | 1.25 | 0.58 | 2.1 | 105 |
| Comparative Example 1 | 1.56 | 0.85 | 0.8 | Failed to evaluate the resistance increase rate due to high resistance |

In Comparative Example 1, as described above, the sulfide solid electrolyte particles wherein the oxygen/sulfur element ratio of the particle surface and the oxygen/sulfur element ratio at a depth of 30 nm from the particle surface were larger than the oxygen/sulfur element ratio specified in the disclosed embodiments, were used. For Comparative Example 1, as shown in Table 1, the ion conductivity was very low, and as a result of incorporating the particles in the all-solid-state battery, as with Examples 1 to 3, the resistance was too high to evaluate the resistance increase rate after the charge-discharge cycles.

In Examples 1 to 3, as described above, the sulfide solid electrolyte particles comprising the sulfide solid electrolyte that comprises Li, P, S and a halogen as constituent elements, were used, wherein the oxygen/sulfur element ratio of the particle surface measured by the XPS, was 0.79 or more and 1.25 or less, and the oxygen/sulfur element ratio at a depth of 30 nm (in terms of a $SiO_2$ sputter rate) from the particle surface measured by the XPS, was 0.58 or less. Examples 1 to 3 were proved to suppress a decrease in ion conductivity and have sufficient ion conductivity.

In the all-solid-state batteries of Examples 1 to 3, as described above, the sulfide solid electrolyte particles comprising the sulfide solid electrolyte that comprises Li, P, S and a halogen as constituent elements, were used as the solid electrolyte, wherein the oxygen/sulfur element ratio of the particle surface measured by the XPS, was 0.79 or more and 1.25 or less, and the oxygen/sulfur element ratio at a depth of 30 nm (in terms of a $SiO_2$ sputter rate) from the particle surface measured by the XPS, was 0.58 or less. The all-solid-state batteries of Examples 1 to 3 were proved to suppress a resistance increase rate after charge-discharge cycles.

REFERENCE SIGNS LIST

1. Sulfide solid electrolyte particle
2. Oxide layer
3. Sulfide solid electrolyte material
11. Cathode layer
12. Anode layer
13. Solid electrolyte layer
20. Cathode active material
100. Power generation element

The invention claimed is:

1. Sulfide solid electrolyte particles comprising a sulfide solid electrolyte that comprises Li, P, S and a halogen as constituent elements,
    wherein an oxygen/sulfur element ratio of a particle surface measured by XPS, is 0.79 or more and 1.25 or less, and an oxygen/sulfur element ratio at a depth of 30 nm (in terms of a $SiO_2$ sputter rate) from the particle surface measured by XPS, is 0.58 or less.

2. The sulfide solid electrolyte particles according to claim 1, wherein the sulfide solid electrolyte particles comprise a sulfide solid electrolyte that comprises Li, P, S, I and Br as constituent elements.

3. An all-solid-state battery comprising a cathode layer, an anode layer and a solid electrolyte layer disposed between the cathode layer and the anode layer,
    wherein at least one of the cathode layer, the anode layer and the solid electrolyte layer comprises the sulfide solid electrolyte particles defined by claim 1.

4. The sulfide solid electrolyte particles according to claim 1,
    wherein the oxygen/sulfur element ratio of the particle surface measured by XPS is 0.79 or more and 0.98 or less, and the oxygen/sulfur element ratio at the depth of 30 nm from the particle surface measured by XPS is 0.39 or less.

* * * * *